United States Patent
Riesselmann et al.

(10) Patent No.: US 6,255,623 B1
(45) Date of Patent: Jul. 3, 2001

(54) SURFACE HEATING SYSTEM FORMED BY A FLUID-CONDUCTING INNER PIPE SURROUNDED BY A HEAT-DESTRUCTIBLE SHEATHING TUBE STRUCTURE

(75) Inventors: Franz-Josef Riesselmann, Lohne; Bernhard Dankbar, Ochtrup, both of (DE)

(73) Assignee: Hewing GmbH, Ochtrup (DE)

( * ) Notice: Subject to any disclaimer, the term of this patent is extended or adjusted under 35 U.S.C. 154(b) by 0 days.

(21) Appl. No.: 09/564,026

(22) Filed: May 4, 2000

(30) Foreign Application Priority Data

May 4, 1999 (DE) .............................. 199 20 410

(51) Int. Cl.⁷ ................................. H05B 11/00
(52) U.S. Cl. ......................... 219/213; 52/472.1
(58) Field of Search ..................... 219/200, 213, 219/528; 392/347, 351, 432, 472, 479, 480, 484, 487, 503, 489, 339, 311; 252/520.1, 518.1; 405/170; 204/252, 266, 279; 52/742.1, 741.4

(56) References Cited

U.S. PATENT DOCUMENTS

| | | | |
|---|---|---|---|
| 3,724,158 | * 4/1973 | Knecht | 52/742.1 |
| 3,758,748 | * 9/1973 | Reid | 219/213 |
| 3,808,400 | * 4/1974 | Cornella et al. | 219/213 |
| 4,314,772 | * 2/1982 | Lestraden | 219/213 |
| 5,573,687 | * 11/1996 | Tanaka | 219/213 |

* cited by examiner

*Primary Examiner*—Tu Ba Hoang
(74) *Attorney, Agent, or Firm*—Diller, Ramik & Wight

(57) ABSTRACT

A surface heating conduit (18) includes a fluid-conducting inner pipe (14), a sheathing tube structure (24) surrounding the fluid-conducting inner pipe (14) serving as a thermal shield for protecting the fluid-conducting inner pipe (14) from external heat influences and which is designed such that, when the surface heating conduit (18) is embedded in a layer (12) of hot mastic asphalt that is cooling down from its working temperature, the sheathing tube structure (24) is destroyed thereby protecting the fluid-conducting inner pipe (14) against thermal influences deleterious to the functionality of the inner pipe.

5 Claims, 1 Drawing Sheet

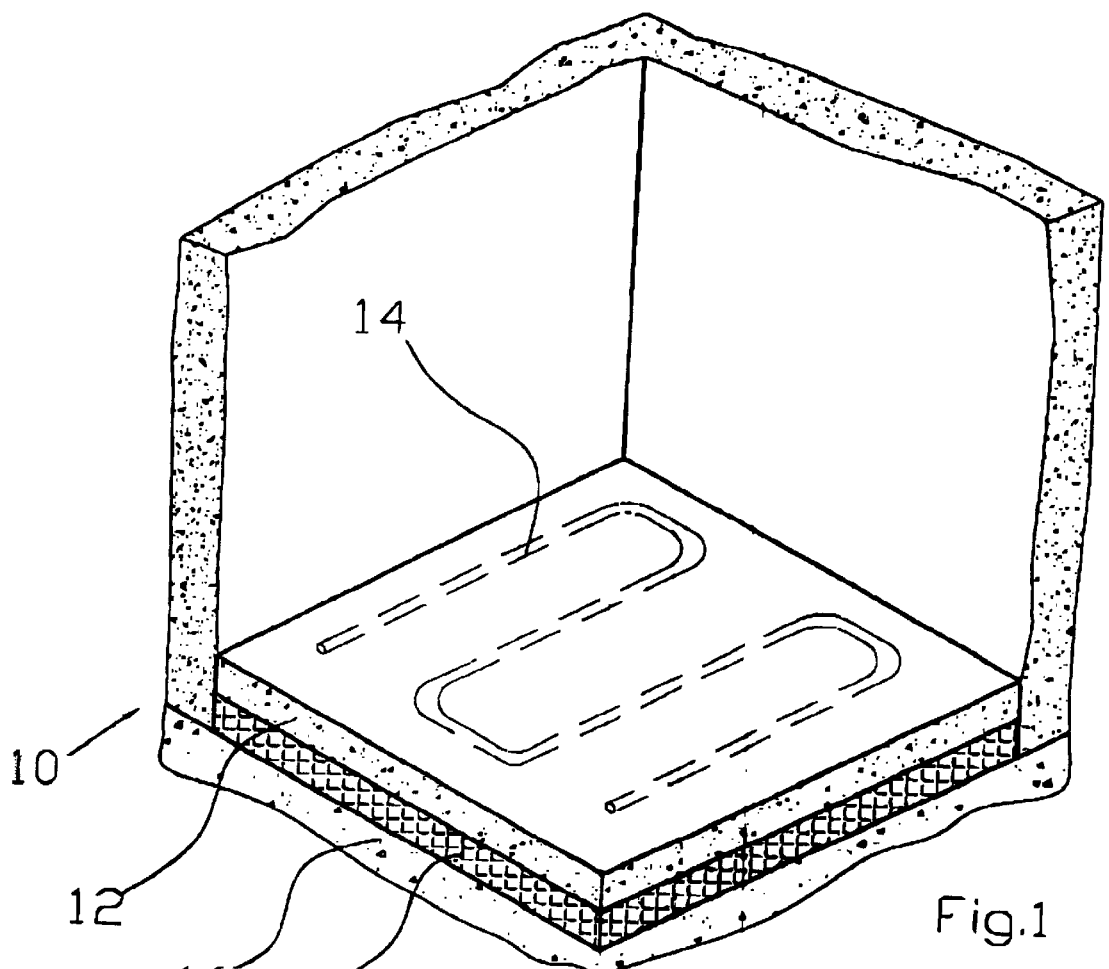
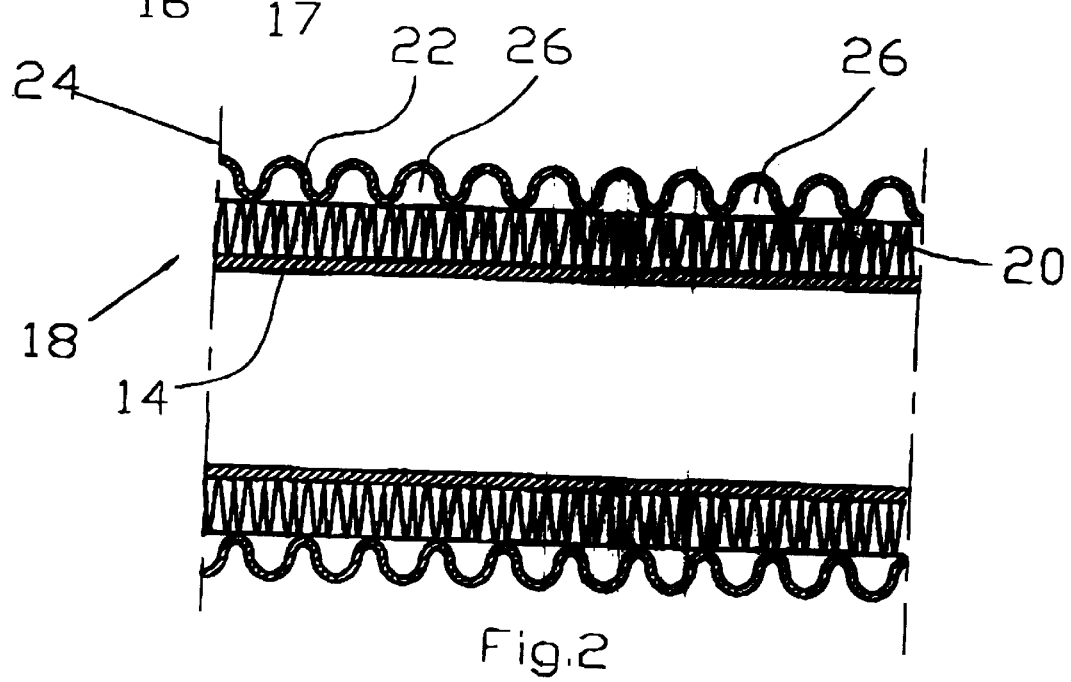

SURFACE HEATING SYSTEM FORMED BY A FLUID-CONDUCTING INNER PIPE SURROUNDED BY A HEAT-DESTRUCTIBLE SHEATHING TUBE STRUCTURE

TITLE OF THE INVENTION

A surface heating conduit, in particular for floor heating, and surface heating structure comprising such a conduit

BACKGROUND ART

The present invention refers to a surface heating conduit, In particular for use in floor heating. Further, the invention refers to a surface heating structure comprising such a surface heating conduit.

Radiant panel heating are constructed such that pipes conducting heating media are embedded In a layer of mortar (lime floor or the like). However, these construction materials (lime floor on cement or plaster basis) are disadvantageous in that relatively large amounts of humidity are brought into the building and the drying time can be substantial, thereby hindering the progress of the construction work. Moreover, at temperatures cures near the freezing point, lime floor may freeze when no heating is provided. Yet, heating the lime floor entails further efforts.

In this respect, the use of mastic asphalt as the embedding material for the surface heating pipes is advantageous. Mastic asphalt needs no drying, but requires a rather high working temperature (up to 250° C.) that there is some danger of damaging the placed pipes should they be of plastic material. Presently, mastic asphalt is used in particular for free surface heatings. As a contrivance, the pipes to be embedded into the mastic asphalt are filled with (cooling) water. After the mastic asphalt has cooled and cured this water has to be drained off again. This is time-consuming.

SUMMARY OF THE INVENTION

It is an object of the present invention to provide a surface heating conduit suited for embedding in mastic asphalt.

According to the invention, a surface heating conduit is provided with a fluid-conducting inner pipe and a sheathing tube structure surrounding the inner pipe, which, regarding the chosen material and wall thickness, serves as a thermal shield for protecting the inner pipe from external heat influences and which is designed such that, when the surface heating conduit is embedded in a layer of mastic asphalt that is cooling down from its working temperature, the sheathing tube structure is destroyed, thereby protecting the inner pipe against thermal influences deleterious to the functionality of the inner pipe. Here, "destruction" means a degradation of the sheathing tube structure such that the mastic asphalt comes into contact with the inner pipe without the same losing its functionality. Thus, the sheathing tube structure is "sacrificed" by thermal energy being transformed therein to a degree that the proper heating conduit, i.e. the fluid-conducting inner pipe, is protected against destruction.

In an advantageous development of the invention, the sheathing tube structure comprises a heat insulating layer surrounding the inner pipe that is made of a foamed plastic material, and an outer tube of plastic material that encloses the heat insulating layer. The heat insulating layer is of material having a low thermal conductivity such as PE or PP foam. The outer tube, particularly a corrugated tube, is preferably made of HDPE, PP or PA. Other plastic materials having a certain heat resistance may be used.

As an alternative to the foamed plastic material, one may use recycled plastic material, e.g. a regenerated plastic material based on PP or PE. This recycled material is filled into the plastic outer tube or introduced into a space between the fluid-conducting inner pipe and the plastic outer tube.

BRIEF DESCRIPTION OF THE DRAWINGS

The following is a detailed description of an embodiment of the invention in conjunction with the drawings. In the Figures:

FIG. 1 is a schematic illustration of a part of the floor heating structure, and FIG. 2 is a longitudinal section through the conduit used with the floor heating of FIG. 1.

DETAILED DESCRIPTION OF A PREFERRED EMBODIMENTS

Referring now to the Figures, FIG. 1 is a schematic illustration of a surface heating structure 10 as it is found, for example, as a floor heating in buildings. The surface heating structure 10 comprises a mastic asphalt layer 12 into which a fluid-conducting pipe 14 is embedded. The mastic asphalt layer 12 is poured onto a substrate such as an insulating layer 17. The insulating layer 17 rests on the rough concrete 16. Depending on the conditions and the loads and stresses to be expected (areas to be driven on or the like), a free surface heating may be constructed without the rough concrete 16 or the substrate may be a bed of broken stones or the like.

The fluid-conducting pipe 14 embedded in the mastic asphalt layer 12 is part of a conduit 18 illustrated in longitudinal section in FIG. 2. The pipe may be made of PE-X material, for example, which is temperature resistant. This pipe 14 Is enclosed by an insulating layer 20 of a material with low thermal conductivity. This material may be PP or PE foam, for example. The insulating layer 20 is endorsed on the outside by a corrugated tube 22 which, preferably, is also of plastic material (HDPE, PP or PA, for example).

The conduit 18 is generally flexible since both the (inner) pipe 14 and the heat insulating layer 20 and the corrugated tube 22 are flexible enough. In placing, the fluid-conducting pipe 14 is mechanically protected by the sheathing tube structure 24 composed of the heat insulating layer 20 and the corrugated tube 22 and may be placed directly on the ground without any further protective measures, if a free surface heating is contemplated, for example.

The sheathing tube structure 24 is a thermally protective shield for the inner pipe 14. When hot mastic asphalt is poured onto the placed conduit 18, the outer corrugated tube 22 is "attacked" first. The great specific heat of plastic materials and the poor thermal conductivity of these materials of the sheathing tube structure 24, the Inner pipe 14 is protected against thermal influences that might deteriorate the functionality of the inner pipe 14.

The corrugated tube 22 slowly collapses after having reached its melting point, thereby transferring the heat onto the underlying thermally Insulating layer 20. The heat Insulation capacity is further increased by air chambers 26 resulting from the structure of the corrugated tube 22 and forming between the same and the thermally insulating layer 20. After the corrugated tube 22 has been destroyed by the heat, the heat front advances to the thermally insulating layer 22. This heat insulating layer 20 will also eventually be destroyed by the heat and slowly collapse. In parallel with these "destructive processes" from the outer corrugated tube 22 to the thermally insulating layer 20, however, the mastic asphalt layer 12 cools down via its rather large interface with the air and the ground so that its temperature has very soon fallen to a degree that, after the destruction of the sheathing tube structure 24, cannot thermally influence the inner pipe 14 in a way that the functionality of the inner pipe 14 is deteriorated. The "collapsing" of the sheathing tube structure 24 has resulted in a good thermal transfer contact between the inner pipe 14 and the mastic asphalt layer 12, which is favorable to the thermal transfer from the inner pipe 14 to the mastic asphalt layer 12.

Thus, the invention provides a conduit 18 that, on the one hand, protects the proper fluid-conducting pipe 14 against extreme external thermal stresses during the making of a surface heating structure of mastic asphalt and, on the other hand, provides for a good thermal contact to the mastic asphalt layer when the surface heating is in operation.

What is claimed is:

1. A surface heating system comprising a heating conduit (18); said heating conduit (18) including a fluid-conducting inner pipe (14) and a sheathing tube structure (24); said sheathing tube structure being disposed in surrounding relationship to said fluid-conducting inner pipe (14), and said sheathing tube structure (24) being made of material and having a wall thickness defining a thermal shield for protecting the fluid-conducting inner pipe (14) from external heat influences whereby when the surface heating conduit (18) is embedded in a layer (12) of hot mastic asphalt that is cooling down from a working temperature, the sheathing tube structure (24) is destroyed thereby protecting the fluid-conducting inner pipe (14) against thermal influences deleterious to the fluid-conducting inner pipe (14).

2. The surface heating system as defined in claim 1 wherein said sheathing tube structure (24) comprises a thermally insulating layer (20) surrounding the fluid-conducting inner pipe (14), said thermally insulating layer (20) being made of one of foamed plastic material and regenerated plastic material, and a plastic material outer tube (22) enclosing said thermally insulating layer (20).

3. The surface heating system as defined in claim 2 wherein said outer tube (22) is a corrugated tube.

4. The surface heating system as defined in claim 1 including a mastic asphalt layer (12) in which is embedded the surface heating conduit (18), and the sheathing tube structure (24) is destroyed by the heat of the hot mastic asphalt layer (12) absent adversely effecting the fluid-conducting inner pipe (14).

5. A method of forming a surface heating system comprising the steps of providing a fluid-conducting inner pipe (14) housed within a sheathing tube structure (24) made of material and having a wall thickness forming a thermal shield for protecting the fluid-conducting inner pipe (14) from external heat influences, embedding the sheathing tube structure (24) in hot mastic asphalt, and effecting the cooling down of the hot mastic asphalt whereby the sheathing tube structure (24) is destroyed thereby protecting the fluid-conducting inner pipe (14) against thermal influences deleterious to the fluid-conducting inner pipe (14).

* * * * *